(12) United States Patent
McDaniel

(10) Patent No.: US 9,797,193 B2
(45) Date of Patent: Oct. 24, 2017

(54) WILDLIFE ACCESS FENCE AND GATE DEVICES, SYSTEMS, AND METHODS

(71) Applicant: Richard G. McDaniel, Peoa, UT (US)

(72) Inventor: Richard G. McDaniel, Peoa, UT (US)

( * ) Notice: Subject to any disclaimer, the term of this patent is extended or adjusted under 35 U.S.C. 154(b) by 0 days.

(21) Appl. No.: 14/796,655

(22) Filed: Jul. 10, 2015

(65) Prior Publication Data

US 2017/0009525 A1    Jan. 12, 2017

(51) Int. Cl.

| E06B 11/00 | (2006.01) |
|---|---|
| E04H 17/14 | (2006.01) |
| E04H 17/16 | (2006.01) |
| A01K 3/00 | (2006.01) |
| E06B 11/02 | (2006.01) |

(52) U.S. Cl.
CPC ............... *E06B 11/00* (2013.01); *A01K 3/00* (2013.01); *E04H 17/14* (2013.01); *E04H 17/16* (2013.01); *E06B 11/02* (2013.01)

(58) Field of Classification Search
CPC ........ A01K 3/002; A01K 3/00; E04H 17/003; E04H 17/00; E04H 17/1417; E06B 11/02
See application file for complete search history.

(56) References Cited

U.S. PATENT DOCUMENTS

| 448,318 | A |  | 3/1891 | Chattanay |  |
|---|---|---|---|---|---|
| 510,511 | A |  | 12/1893 | Keith |  |
| 703,130 | A | * | 6/1902 | Jacobs | A01K 3/00 119/841 |
| 814,746 | A |  | 3/1906 | Stroud |  |
| 995,338 | A |  | 6/1911 | Folsom |  |
| 2,144,896 | A |  | 10/1937 | Raymond |  |
| 4,572,109 | A |  | 2/1986 | Nixon |  |
| 5,267,724 | A |  | 12/1993 | Heath |  |
| 5,606,830 | A | * | 3/1997 | Townsend, Jr. | A01M 29/32 256/11 |
| 6,199,831 | B1 |  | 3/2001 | Patrick |  |
| 7,562,453 | B1 |  | 7/2009 | Benner |  |
| 7,686,283 | B2 | * | 3/2010 | Marchio | E06B 11/02 256/11 |
| 8,308,141 | B1 |  | 11/2012 | Mellins |  |

(Continued)

FOREIGN PATENT DOCUMENTS

| DE | 29712468 U1 | * | 10/1997 | ............ E04H 17/00 |
|---|---|---|---|---|
| EP | 0734649 A2 | * | 10/1996 | ........... A01K 1/0017 |

OTHER PUBLICATIONS http://www.wildlifeonline.me.uk/fox_deterrence.html; "How do I Keep Foxes Out of My Garden and Secure My Pets?"; Oct. 13, 2015.

(Continued)

*Primary Examiner* — Jonathan Masinick
(74) *Attorney, Agent, or Firm* — Workman Nydegger

(57) ABSTRACT

A wildlife access fence or gate may include at least one pass-through section having a guard attached thereto. The pass-through section may be a jump-through section and a jump guard attached thereto that defines a jump height and jump span that selectively allows wildlife to leap over and/or through the fence while preventing cattle from crossing the fence. The fence or gate may include a crawl-through section and a crawl guard that selectively allows wildlife to crawl under and/or through the fence while preventing cattle from crossing the fence.

20 Claims, 5 Drawing Sheets

(56) References Cited

U.S. PATENT DOCUMENTS

| | | | | |
|---|---|---|---|---|
| 8,359,791 | B1* | 1/2013 | Nixon | A01M 29/32 |
| | | | | 119/537 |
| 8,840,090 | B2 | 9/2014 | Moore | |
| 9,187,922 | B1* | 11/2015 | Phillips, Jr. | E04H 17/00 |
| 2006/0065209 | A1* | 3/2006 | May | A01K 1/0613 |
| | | | | 119/502 |
| 2007/0252125 | A1 | 11/2007 | Thompson | |
| 2010/0276652 | A1* | 11/2010 | Horton | A01K 3/00 |
| | | | | 256/17 |
| 2013/0221305 | A1* | 8/2013 | Dilworth | A01K 1/0017 |
| | | | | 256/73 |

OTHER PUBLICATIONS http://www.wildlifeextra.com/go/news/pest-fence.html#crl; New design of pest proof fence proving a saviour for New Zealand's wildlife; Mar. 23, 2015.

* cited by examiner

WILDLIFE ACCESS FENCE AND GATE DEVICES, SYSTEMS, AND METHODS

BACKGROUND OF THE DISCLOSURE

Ranchers use fences and gates to limit or control the movement of livestock. Fences may vary in height and design depending on the livestock intended to be controlled. For example, fences intended for use controlling pigs may have a lower height than those intended for use with horses as the pigs are commonly smaller animals than the horses. In some cases, smaller livestock, such as goats, may be able to jump over a fence considerably taller than the livestock and warrant a taller fence to control their movement. In other cases, a fence may need to be reinforced against the mass and strength of the livestock who might push against or lean upon the fence such as a fence intended for use with cattle.

Cattle walk the perimeter of a ranch fence and seek gaps in the fence. A cattle fence may be relatively high and strong due to the size and strength of the cattle, while also having openings through the fence sufficiently small to prevent the movement of calves through the fence and beyond the limits of the intended grazing land. Particularly, a calf passing beyond a fence may incite a mother cow to pursue the calf and injure itself, damage the fence, or both. Many fences intended for use in controlling the movement of cattle, therefore, may be relatively high, strong, and have relatively small openings therethrough.

The land on which cattle graze may be very large, with some ranches in excess of a hundreds of thousands of acres. A perimeter fence of ranches, and particularly a large ranch, often crosses many natural game trails and can interfere with the travel of wildlife, such as elk, deer, antelope, and predators that prey upon them. Wildlife will resist deviating from their historic trails and, instead, will try to cross the fences. Wildlife crossing the fences leads to damage to the fences and injuries to the wildlife. Additionally, if the wildlife is unable to cross the fence, the deviation from the game trail affects the wildlife's movement and, therefore, migration patterns, feeding, and overall health.

Damage to fences by both livestock and wildlife requires constant monitoring and repair of the fences of the fence line by ranchers. The fence line is monitored by physically inspecting the fence line, traditionally on horseback or other means of travel, for many hours per day. A fence that is resistant to damage by both livestock and wildlife that may prevent passage of livestock while permitting passage of wildlife is therefore desirable.

BRIEF SUMMARY OF THE DISCLOSURE

This summary is provided to introduce a selection of concepts that are further described below in the detailed description. This summary is not intended to identify specific features of the claimed subject matter, nor is it intended to be used as an aid in limiting the scope of the claimed subject matter.

In one embodiment, a pass-through device for controlling movement of animals includes a frame with a pass-through section extending therethrough and a guard affixed to the frame adjacent the pass-through section. The frame has a front side and a back side, and the pass-through section extends from the front side to the back side and defines a jump height.

In another embodiment, a pass-through device for controlling movement of animals includes a frame with a first opening and a second opening therethrough, and a first guard affixed to the frame adjacent the first opening. The first guard has a first guard surface that extends outwardly away from a front side of the frame and outwardly away from a back side of the frame. The first opening is bounded on at least two sides by the frame and on one side by the first guard. The second opening is bounded on at least three sides by the frame.

In yet another embodiment, a pass-through device for controlling movement of animals includes a frame with a first opening and a second opening therethrough, a first guard affixed to the frame adjacent the first opening, and a second guard affixed to the frame adjacent the second opening. The first guard has a first guard surface that extends outwardly away from a front side of the frame and outwardly away from a back side of the frame. The second guard has a second guard surface that extends outwardly away from a front side of the frame and outwardly away from a back side of the frame. The first opening is bounded on at least two sides by the frame and on one side by the first guard. The second opening is bounded on at least three sides by the frame and on side by the second guard.

In a yet further embodiment, a system for controlling movement of animals includes a pass-through device, which includes a frame having a jump-through section and a crawl-through section, and a configured to connect the pass-through device to a fence line with a plurality of posts. The jump-through section has a jump guard affixed to the jump-through section, where the jump guard extends outwardly away from the frame from the front side and the back side and slopes downward. The crawl-through section has a crawl guard affixed to the crawl-through section, where the crawl guard extends outwardly away from the frame from the front side and the back side and slopes upward.

Additional features of embodiments of the disclosure will be set forth in the description which follows. The features of such embodiments may be realized by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

One or more specific embodiments of the present disclosure will be described below. In an effort to provide a concise description of these embodiments, some features of an actual embodiment may be described in the specification. It should be appreciated that in the development of any such actual embodiment, as in any engineering or design project, numerous embodiment-specific decisions will be made to achieve the developers' specific goals, such as compliance with system-related and business-related constraints, which may vary from one embodiment to another. It should further be appreciated that such a development effort might be complex and time consuming, but would nevertheless be a routine undertaking of design, fabrication, and manufacture for those of ordinary skill having the benefit of this disclosure.

One or more embodiments of the present disclosure may generally relate to constructing and installing a pass-through device having a frame with a pass-through section with a guard. It should be understood that while the present disclosure may describe various embodiments of a pass-through device in the context of fences, the elements described herein may be equally applicable to gates. For example, a pass-through device described herein may be moveably attached to a post using one or more hinges and/or latches to create a gate. The terms "fence" or "gate" should not be interpreted to limit the scope of the disclosure. The pass-through section of the pass-through device may be a jump-through section, elevated from the ground level, or a crawl-through section, situated at or near ground level. For example, a jump-through section may be located at a height sufficient to prevent cattle or other livestock from climbing over. In another example, a crawl-through section of the frame may be closed on four sides by the frame and positioned and/or sized to selectively allow wildlife and not livestock to pass therethrough.

Figure 1:
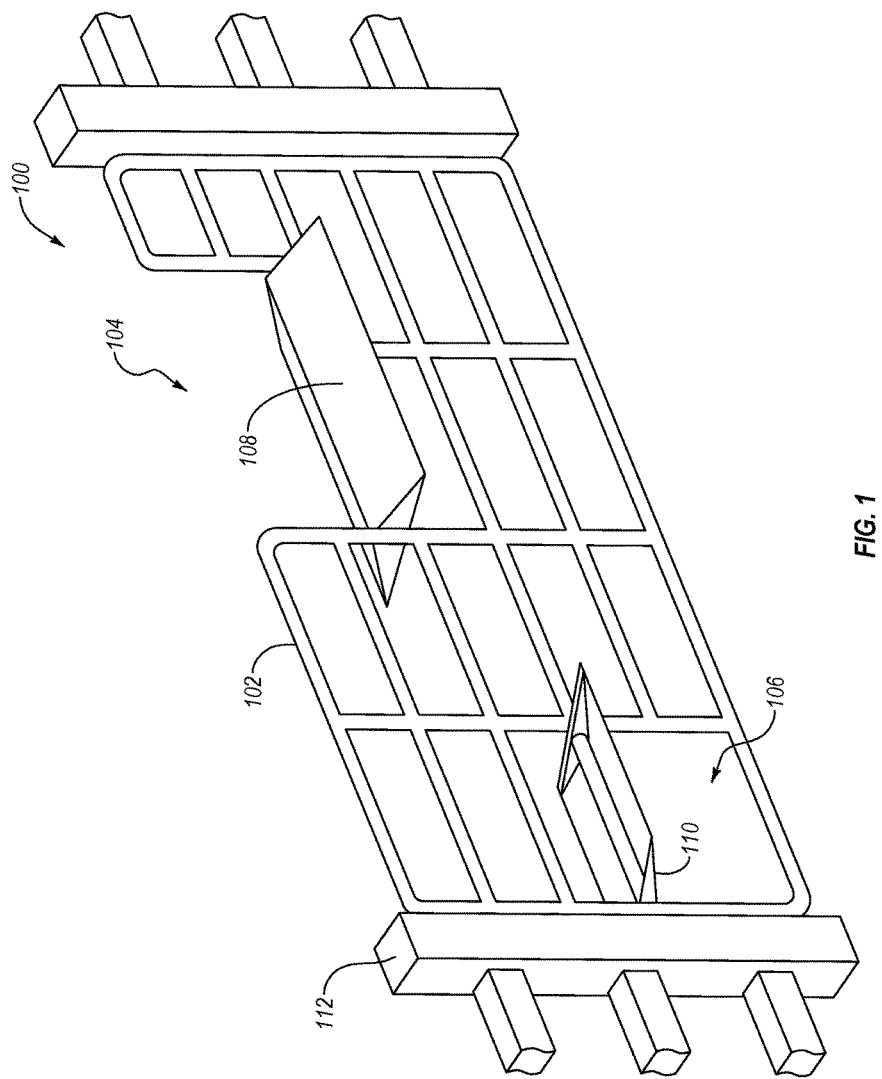
FIG. 1 is a perspective view of one embodiment of a wildlife access fence, according to the present disclosure.

FIG. 1 is a perspective view of an embodiment of a livestock pass-through device 100, according to the present disclosure. The pass-through device 100 may include a frame 102 and one or more pass-through sections in the frame 102. The one or more pass-through sections may allow wildlife to pass through or over a portion of the pass-through device 100 without significantly impeding their movement. For example, a pass-through section may be a jump-through section 104 or a crawl-through section 106. A pass-through device 100 may include any number of jump-through sections 104 and/or crawl-through sections 106 in any combination. In some embodiments, a pass-through device 100 may have an equal number of jump-through sections 104 and crawl-through sections 106 (i.e., jump-through sections 104 and crawl-through sections 106 are paired). In other embodiments, a pass-through device 100 may include an unequal number of jump-through sections 104 and crawl-through sections 106. For example, a pass-through device 100 may include one jump-through section 104 and one crawl-through section 106. In another example, a pass-through device 100 may include two jump-through sections 104 and one crawl-through section 106. In yet another example, the pass-through device 100 may include one jump-through section 104 and three crawl-through sections 106. In at least one embodiment, a pass-through device 100 may have only jump-through sections 104 in the frame 102. In at least one other embodiment, a pass-through device 100 may have only crawl-through sections 106 in the frame 102. Such embodiments may allow the frame 102 to be stronger than a frame 102 having at least one jump-through section 104 and at least one crawl-through section 106. Such embodiments may be connected in series along a fence line to provide both jump-through sections 104 and crawl-through sections 106 through which wildlife can pass.

A fence may have a guard connected to the frame 102 adjacent to the pass-through section. The guard may extend outwardly away from the frame 102. For example the guard may have a dimension substantially perpendicular to a plane defined by the frame 102. As illustrated in FIG. 1, the pass-through device 100 may have a jump guard 108 connected to the frame 102 adjacent to the jump-through section 104. The jump guard 108 may extend outwardly and away from the frame and define a guard span over which wildlife may jump to pass through the jump-through section 104. The jump guard 108 may thereby allow leaping wildlife such as elk, antelope, deer, and the like, to pass through the pass-through device 100 while substantially limiting or preventing non-leaping livestock, such as cattle, sheep, or the like, from passing through the jump-through section 104. The outwardly extending depth of the jump guard 108 may prevent non-leaping animals from simply climbing over the frame 102 and through the jump-through section 104.

To aid the leading wildlife in jumping over the jump guard 108 and through the jump-through section 104 without incurring injury, the jump guard 108 may have one or more sloping surfaces extending away from a centerline, as will be described in more detail in relation to FIG. 4. In some embodiments, the centerline may be a peaked centerline. In other embodiments, the jump guard 108 may have a curved surface or sloping surfaces extending away from a substantially horizontal surface.

Similarly, the crawl-through section 106 may have a crawl guard 110 with one or more sloping surfaces. As shown in FIG. 1, the crawl-through section 106 may be bordered along a top of the crawl-through section 106 by the crawl guard 110. The crawl guard 110 may be connected to the frame 102 and may extend away from the frame 102. The crawl guard 110 may provide a substantially horizontal span under which wildlife may crawl to pass through the crawl-through section 106. The outwardly extending depth of the crawl guard 110 may prevent larger animals from simply pressing against the frame 102 and forcing their body through the crawl-through section 106. For example, a deer fawn may lower their body and crawl through the crawl-through section 106 below the horizontal span of the crawl guard 110, while cattle, in particular a calf, may be able to lower their head to push under a fence of greater height, the calf will not lower their entire body and crawl along the ground to pass underneath the crawl guard 110, as a calf may weigh greater than 100 pounds (45.5 kg) within one week of birth.

The jump guard 108 and/or crawl guard 110 may be affixed to the frame 102 by any appropriate connection mechanisms. In some embodiments, the jump guard 108 and/or crawl guard 110 may be affixed to the frame 102 by welding, brazing, adhesives, mechanical fasteners, or combinations thereof. In other embodiments, the jump guard 108 and/or crawl guard 110 may be integrally formed with the frame 102. In yet other embodiments, the jump guard 108 and/or crawl guard 110 may be affixed to the frame 102 via a removable connection, allowing for ease of repair and/or packaging. The jump guard 108 and/or crawl guard 110 may have solid ends providing additional support to the jump guard 108 and/or crawl guard 110. Solid ends may provide additional fixation points through which the jump guard 108 and/or crawl guard 110 may be connected to the frame 102. In other embodiments, the ends of the jump guard 108 and/or crawl guard 110 may be open to allow winds and/or precipitation to pass through the jump guard 108 and/or crawl guard 110 more easily and with less damage to the jump guard 108 and/or crawl guard 110.

The pass-through device 100 may be a section of a fence line that includes fencing supported by a plurality of posts 112. The pass-through device 100 may span a width between and may be supported by posts 112. The pass-through device 100 may be moveably connected to the post 112 for use as a gate or may be stationary relative to the post 112 as a portion of the fence line. The pass-through device 100 may be connected to existing posts 112 or other support structures to retrofit an existing fence with pass-through sections for wildlife. In particular, the pass-through device 100 may be selectively added to new or existing fence lines at or near known game trails to promote usage of the pass-through device 100 by wildlife.

Figure 2:
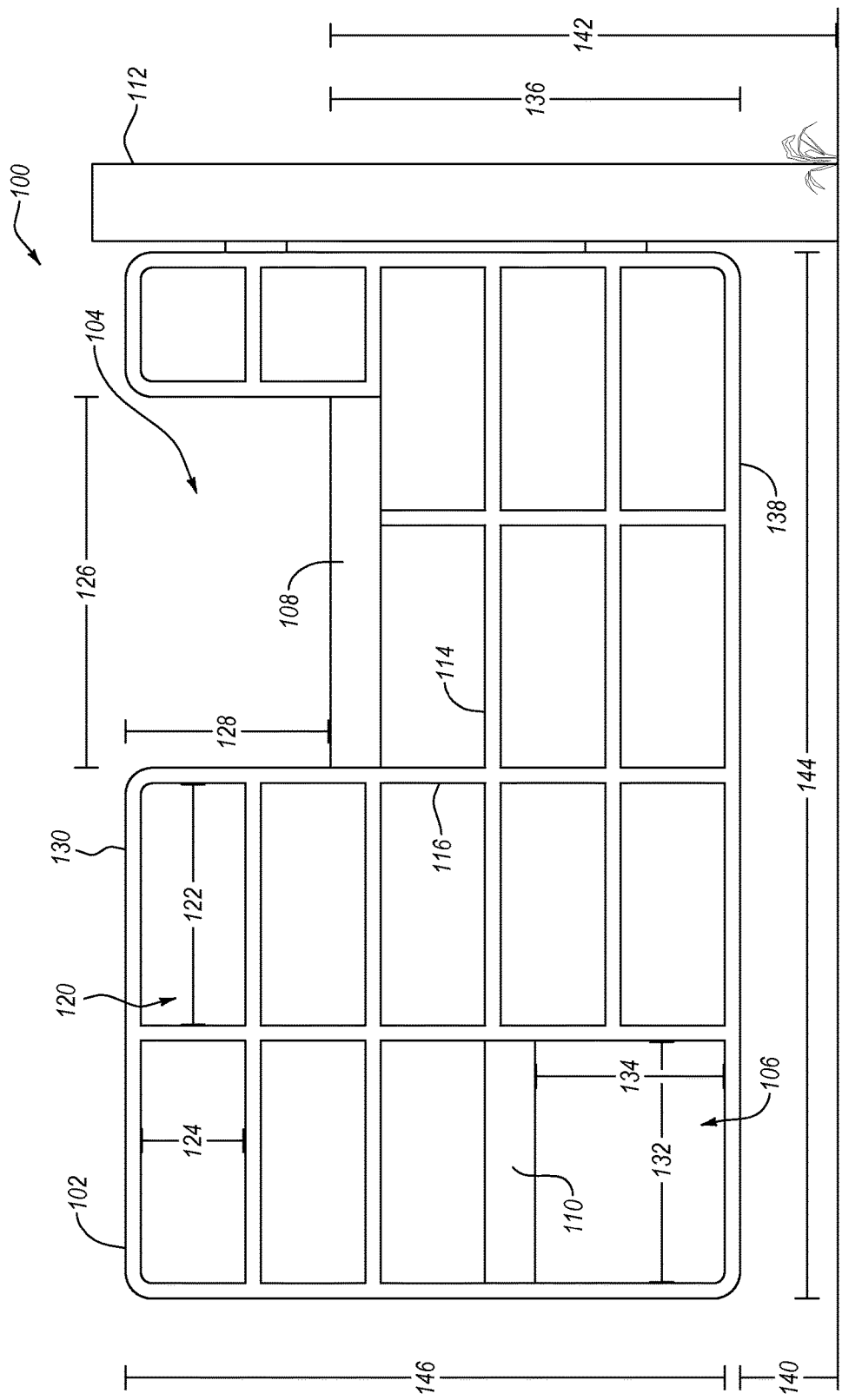
FIG. 2 is a front view of the wildlife access fence of FIG. 1, according to the present disclosure.

FIG. 2 is a front view of the pass-through device 100 of FIG. 1. The frame 102 may be made of any suitably strong material, such as steel alloys, iron alloys, aluminum alloys, titanium alloys, reinforced polymers, carbon fiber, wood, or combinations thereof. In at least one embodiment, the frame 102 may be made of tubular steel members. In some embodiments, the frame 102 may include a grid pattern having horizontal struts 114 and vertical struts 116. In other embodiments, the frame 102 may be substantially continuous, such as a continuous sheet of steel, wood, polymer, other material, or combinations thereof. In yet other embodiments, the frame 102 may include both one or more sheets and one or more horizontal and/or vertical struts. In some embodiments, the pass-through device 100 may include a single continuous frame 102, while in other embodiments, the pass-through device 100 may include a plurality of frames 102 positioned adjacently to one another. For example, the pass-through device 100 may include a plurality of frames 102 that are adjacently connected by a post 112. In another example, the pass-through device 100 may include a pair of frames 102 that are each movably connected to separate posts 112 by hinges to allow the pair of frames 102 to swing independently of one another as a set of gates. While the present disclosure may describe a pass-through device 100 in context of a frame 102 having at least one jump-through section 104 and/or a crawl-through section 106, it should be understood that a pass-through device 100 according to the present disclosure may include a pass-through device 100 having one or more frames 102 having at least one jump-through section 104 and/or a crawl-through section 106.

The horizontal struts 114 and vertical struts 118 may define frame openings 120, each of which may have an opening width 122 and an opening height 124. In some embodiments, the opening widths 122 and opening heights 124 may be substantially the same between openings 120 in the frame 102. In other embodiments, the opening widths 122 and opening heights 124 may vary between openings 120. The opening width 122 may be in a range having upper and lower values including any of 0.25 feet, 0.50 feet, 0.75 feet, 1.00 foot, 1.25 feet, 1.50 feet, 1.75 feet, 2.00 feet, 2.25 feet, 2.50 feet, 2.75 feet, 3.00 feet, 3.25 feet, 3.50 feet, 3.75 feet, 4.00 feet, or any value therebetween. For example, an opening width 122 may be in a range of 0.25 feet to 4.00 feet. In another example, the opening width 122 may be in a range of 1.00 foot to 3.00 feet. In yet another example, the opening width 122 may be about 2.00 feet. The opening height 124 may be in a range having upper and lower values including any of 0.25 feet, 0.50 feet, 0.75 feet, 1.00 foot, 1.25 feet, 1.50 feet, 1.75 feet, 2.00 feet, 2.25 feet, 2.50 feet, 2.75 feet, 3.00 feet, 3.25 feet, 3.50 feet, 3.75 feet, 4.00 feet, or any value therebetween. For example, an opening height 124 may be in a range of 0.25 feet to 4.00 feet. In another example, the opening height 124 may be in a range of 0.50 feet to 2.00 feet. In yet another example, the opening height 124 may be about 1.00 foot. In at least one embodiment, the frame 102 has at least one opening 120 with an opening width 122 of about 2.00 feet and an opening height 124 of about 1.00 foot.

The pass-through sections may be sized to allow wildlife to pass therethrough. For example, the jump-through section 104 may have a jump-through width 126 and a jump-through height 128. The jump-through height 128 should be understood to be the distance between the jump guard 108 and a top edge 130 of the frame 102. The jump-through width 126 may be in a range having upper and lower values including any of 2.00 feet, 2.25 feet, 2.50 feet, 2.75 feet, 3.00 foot, 3.25 feet, 3.50 feet, 3.75 feet, 4.00 feet, 4.25 feet, 4.50 feet, 4.75 feet, 5.00 feet, 5.25 feet, 5.50 feet, 5.75 feet, 6.00 feet, or any value therebetween. For example, a jump-through width 126 may be in a range of 2.00 feet to 6.00 feet. In another example, the jump-through width 126 may be in a range of 3.00 foot to 5.00 feet. In yet another example, the jump-through width 126 may be about 4.00 feet. The jump-through height 128 may be in a range having upper and lower values including any of 0.25 feet, 0.50 feet, 0.75 feet, 1.00 foot, 1.25 feet, 1.50 feet, 1.75 feet, 2.00 feet, 2.25 feet, 2.50 feet, 2.75 feet, 3.00 feet, or any value therebetween. For example, the jump-through height 128 may be in a range of 0.25 feet to 3.00 feet. In another example, the jump-through height 128 may be in a range of 1.00 foot to 3.00 feet. In yet another example, the jump-through height 128 may be about 1.50 feet. In at least one embodiment, the jump-through section 104 has a jump-through width 126 of about 4.00 feet and jump-through height 128 of about 1.50 feet.

The crawl-through section 106 may be larger than the openings 120 and have a crawl-through width 132 and a crawl-through height 134. The crawl-through width 132 may be in a range having upper and lower values including any of 1.00 foot, 1.25 feet, 1.50 feet, 1.75 feet, 2.00 feet, 2.25 feet, 2.50 feet, 2.75 feet, 3.00 foot, 3.25 feet, 3.50 feet, 3.75 feet, 4.00 feet, 4.25 feet, 4.50 feet, 4.75 feet, 5.00 feet, 5.25 feet, 5.50 feet, 5.75 feet, 6.00 feet, or any value therebetween. For example, a crawl-through width 132 may be in a range of 1.00 foot to 6.00 feet. In another example, the crawl-through width 132 may be in a range of 1.50 feet to 4.00 feet. In yet another example, the crawl-through width 132 may be about 2.00 feet. The crawl-through height 134 may be in a range having upper and lower values including any of 1.00 foot, 1.25 feet, 1.50 feet, 1.75 feet, 2.00 feet, 2.25 feet, 2.50 feet, or any value therebetween. For example, the crawl-through height 134 may be in a range of 1.00 foot to 2.50 feet. In another example, the crawl-through height 134 may be in a range of 1.50 feet to 2.00 feet. In yet another example, the crawl-through height 134 may be about 1.50 feet. In at least one embodiment, the crawl-through section 106 has a crawl-through width 132 of about 2.00 feet and crawl-through height 134 of about 1.50 feet.

The location of the jump guard 108 along the bottom of the jump-through section 104 may be a guard height 136 from the bottom 138 of the frame 102. The frame 102 may be mounted to a post 112 or other support structure a mount height 140 above the ground. The guard height 136 and mount height 140 together may define a jump height 142 above the ground. The guard height 136 may be in range having upper and lower values including any of 1.50 feet, 1.75 feet, 2.00 feet, 2.25 feet, 2.50 feet, 2.75 feet, 3.00 foot, 3.25 feet, 3.50 feet, 3.75 feet, 4.00 feet, 4.25 feet, 4.50 feet, 4.75 feet, 5.00 feet, 5.25 feet, 5.50 feet, 5.75 feet, 6.00 feet, or any value therebetween. For example, a guard height 136 may be in a range of 1.50 feet to 6.00 feet. In another example, the guard height 136 may be in a range of 2.00 feet to 4.00 feet. In yet another example, the guard height 136 may be about 3.00 feet. The mount height 140 of the frame 102 may be in a range having upper and lower values including any of 2 inches, 4 inches, 6 inches, 8 inches, 10 inches, 12 inches, or any value therebetween. For example, a mount height 140 may be in a range of 2 inches to 12 inches. In another example, the mount height 140 may be in a range of 4 inches to 8 inches. In yet another example, the mount height 140 may be about 6 inches.

The jump height 142 of the pass-through device 100 may at least partially determine the wildlife that may pass through the jump-through section 104 of the pass-through device 100. In general, a greater jump height 142 may substantially prevent more animals from passing through the jump-through section 104 than a lesser jump height 142. For example, a white tail deer can leap higher than a pronghorn antelope. While a pronghorn antelope may be able to physically jump a 5 foot high fence, behaviorally, most pronghorn will not attempt to jump over an obstacle more than approximately 3 feet tall. In some embodiments, the jump height 142 of the pass-through device 100 may be in a range having upper and lower values including any of 2.50 feet, 2.75 feet, 3.00 foot, 3.25 feet, 3.50 feet, 3.75 feet, 4.00 feet, 4.25 feet, 4.50 feet, 4.75 feet, 5.00 feet, 5.25 feet, 5.50 feet, 5.75 feet, 6.00 feet, or any value therebetween. For example, a jump height 142 may be in a range of 2.50 feet to 6.00 feet. In another example, the jump height 142 may be in a range of 3.00 feet to 5.00 feet. In yet another example, the jump height 142 may be about 3.50 feet.

As described herein, various embodiments of the frame 102 of a pass-through device 100 may have different sizes to accommodate a particular application. For example, depending on the landscape and/or terrain over which the pass-through device 100 may be installed, the frame 102 may have different sizes of frame width 144 and frame height 146. In some embodiments, the frame width 144 may be in a range of values including any of 4.00 feet, 4.25 feet, 4.50 feet, 4.75 feet, 5.00 feet, 5.25 feet, 5.50 feet, 5.75 feet, 6.00 feet, 6.25 feet, 6.50 feet, 6.75 feet, 7.00 feet, 7.25 feet, 7.50 feet, 7.75 feet, 8.00 feet, 8.25 feet, 8.50 feet, 8.75 feet, 9.00 feet, 9.25 feet, 9.50 feet, 9.75 feet, 10.00 feet, or any value therebetween. For example, the frame width 144 may be in a range of 4.00 feet to 10.00 feet. In another example, the frame width 144 may be in a range of 5.00 feet to 9.00 feet. In yet another example, the frame width 144 may be about 8.00 feet. In a yet further example, the frame width 144 may be about 6.00 feet. In other embodiments, the frame width 144 may be larger than 10.00 feet. For example, a frame width 144 may be about 12.00 feet.

The frame height 146 may be any size suitable to substantially prevent livestock from crossing the pass-through device 100. In some embodiments, the frame height 146 may be in a range having upper and lower values including any of 3.00 feet, 3.25 feet, 3.50 feet, 3.75 feet, 4.00 feet, 4.25 feet, 4.50 feet, 4.75 feet, 5.00 feet, 5.25 feet, 5.50 feet, 5.75 feet, 6.00 feet, 6.25 feet, 6.50 feet, 6.75 feet, 7.00 feet, or any value therebetween. For example, the frame height 146 may be in a range of 3.00 feet to 7.00 feet. In another example, the frame height 146 may be in a range of 4.00 feet to 6.00 feet. In yet another example, the frame height 146 may be about 4.50 feet. In a yet further example, the frame height 146 may be about 50.5 inches.

While FIG. 2 depicts the jump-through section 104 and the crawl-through section 106 as being staggered or otherwise misaligned relative to one another along the width of the frame 102, in other embodiments, the jump-through section 104 and the crawl-through section 106 may, at least partially, overlap one another relative to the width of the frame 102. For example, at least a portion of the jump-through section 104 and at least a portion of the crawl-through section 106 may be directly aligned above and below one another. In another example, the entire jump-through section 104 may be directly above at least a portion of the crawl-through section 106. In yet another example, at least a portion of the jump-through section 104 may be directly above the entire crawl-through section 106. In a further example, the entire jump-through section 104 may be aligned above the entire crawl-through section 106.

Figure 3:
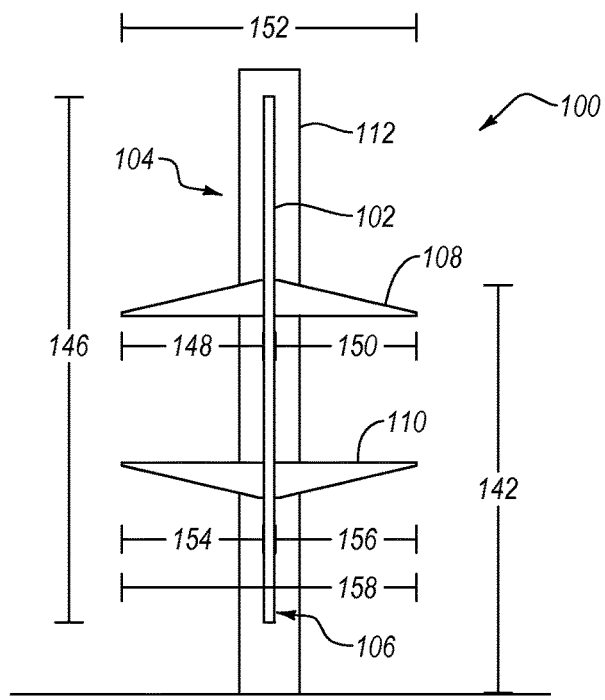
FIG. 3 is a side view of the wildlife access fence of FIG. 1, according to the present disclosure.

FIG. 3 is a side view of the pass-through device 100 shown mounted to the post 112 or other support member on a far side of the pass-through device 100 and without a post or other support member on the near side to allow the pass-through device 100 to be visible. It should be understood that while the pass-through device 100 may be movably mounted on a single side of the frame 102 to allow the pass-through device 100 to operate as a gate, the pass-through device 100 may be mounted on both sides to securely hold the pass-through device 100, and the depiction of the pass-through device 100 in FIG. 3 should not be considered limiting. The jump guard 108 and crawl guard 110 extend outwardly away from the frame 102 and as such have a guard span. In at least one embodiment, the jump guard 108 and/or crawl guard 110 may extend outwardly away from the frame 102 in a direction substantially perpendicular to the frame 102. In other embodiments, the jump guard 108 and/or crawl guard 110 may extend outwardly away from the frame 102 at a non-perpendicular angle.

The jump guard 108, in some embodiments, may extend outwardly away from the frame 102 in equal amounts in either direction thereby giving the jump guard 108 a depth. In other embodiments, the jump guard 108 may have a first jump extension 148 and a second jump extension 150 that extend away from the frame 102 in a first direction and a second, opposing direction, respectively, and the first jump extension 148 and second jump extension 150 may have differing depths. For example, the first jump extension 148 may be longer than the second jump extension 150. In another example, the second jump extension 150 may be longer than the first jump extension 148. In some embodiments, the first jump extension 148 may have a depth in a range having upper and lower values including any of 0.50 feet, 0.75 feet, 1.00 foot, 1.25 feet, 1.50 feet, or any value therebetween. For example, the first jump extension 148 may have a depth in a range of 0.50 feet to 1.50 feet. In another example, the first jump extension 148 may have a depth in a range of 0.75 feet to 1.25 feet. In yet another example, the first jump extension 148 may have a depth of about 1.00 foot. In some embodiments, the second jump extension 150 may have a depth in a range having upper and lower values including any of 0.50 feet, 0.75 feet, 1.00 foot, 1.25 feet, 1.50 feet, or any value therebetween. For example, the second jump extension 150 may have a depth in a range of 0.50 feet to 1.50 feet. In another example, the second jump extension 150 may have a depth in a range of 0.75 feet to 1.25 feet. In yet another example, the second jump extension 150 may have a depth of about 1.00 foot.

The first jump extension 148 and second jump extension 150 may, collectively define a guard span and, more specifically, a jump span 152 of the jump guard 108. The jump span 152, in combination with the jump height 142, may limit what animals or wildlife may pass through the jump-through section 104. A wider jump span 152 may limit the wildlife that may pass through the jump-through section 104 to those animals that can leap the jump span 152 horizontally while also clearing the jump height 142. In some embodiments, the jump span 152 may be in a range having upper and lower values including any of 1.00 foot, 1.25 feet, 1.50 feet, 1.75 feet, 2.00 feet, 2.25 feet, 2.50 feet, 2.75 feet, 3.00 feet, or any value therebetween. For example, the jump span 152 may have a depth in a range of 1.00 foot to 3.00 feet. In another example, the jump span 152 may have a depth in a range of 1.50 feet to 2.50 feet. In yet another example, the jump span 152 may have a depth of about 2.00 feet. The jump span 152 may be at least partially related to the jump height 142. In some embodiments, the jump span 152 may be about ½ of the jump height 142. In other embodiments, the jump span 152 may be about ⅓ of the jump height 142. In yet other embodiments, the jump span 152 may be about ¼ of the jump height 142.

In some embodiments, the first jump extension 148 and second jump extension 150 may extend away from the frame 102 at equal angles relative to the frame 102. In other embodiments, the first jump extension 148 and second jump extension 150 may extend away from the frame 102 at unequal angles relative to the frame 102. For example, the first jump extension 148 may extend away from the frame 102 at about a 45° angle and second jump extension 150 may extend away from the frame 102 at about a 90° angle.

As with jump guard 108, the crawl guard 110, in some embodiments, may extend away from the frame 102 equal amounts in either direction. In other embodiments, the crawl guard 110 may have a first crawl extension 154 and a second crawl extension 156 that extend away from the frame 102 in a first direction and a second, opposing direction, respectively and the first crawl extension 154 and second crawl extension 156 may have differing depths. For example, the first crawl extension 154 may be longer than the second crawl extension 156. In another example, the second crawl extension 156 may be longer than the first crawl extension 154. In some embodiments, the first crawl extension 154 may have a depth in a range having upper and lower values including any of 0.50 feet, 0.75 feet, 1.00 foot, 1.25 feet, 1.50 feet, or any value therebetween. For example, the first crawl extension 154 may have a depth in a range of 0.50 feet to 1.50 feet. In another example, the first crawl extension 154 may have a depth in a range of 0.75 feet to 1.25 feet. In yet another example, the first crawl extension 154 may have a depth of about 1.00 foot. In some embodiments, the second crawl extension 156 may have a depth in a range having upper and lower values including any of 0.50 feet, 0.75 feet, 1.00 foot, 1.25 feet, 1.50 feet, or any value therebetween. For example, the second crawl extension 156 may have a depth in a range of 0.50 feet to 1.50 feet. In another example, the second crawl extension 156 may have a depth in a range of 0.75 feet to 1.25 feet. In yet another example, the second crawl extension 156 may have a depth of about 1.00 foot.

The first crawl extension 154 and second crawl extension 156 may, collectively define a guard span and, more specifically, a crawl span 158 of the crawl guard 110. The crawl span 158, in combination with the crawl-through height 134, may limit what animals or wildlife may pass through the crawl-through section 106. A wider crawl span 158 may limit the wildlife that may pass through the crawl-through section 106 to those animals that can lower their bodies and crawl under the crawl span 158 horizontally. In some embodiments, the crawl span 158 may be in a range having upper and lower values including any of 1.00 foot, 1.25 feet, 1.50 feet, 1.75 feet, 2.00 feet, 2.25 feet, 2.50 feet, 2.75 feet, 3.00 feet, or any value therebetween. For example, the crawl span 158 may have a depth in a range of 1.00 foot to 3.00 feet. In another example, the crawl span 158 may have a depth in a range of 1.50 feet to 2.50 feet. In yet another example, the crawl span 158 may have a depth of about 2.00 feet.

In some embodiments, the first crawl extension 154 and second crawl extension 156 may extend away from the frame 102 at equal angles relative to the frame 102. In other embodiments, the first crawl extension 154 and second crawl extension 156 may extend away from the frame 102 at unequal angles relative to the frame 102. For example, the first crawl extension 154 may extend away from the frame 102 at about a 45° angle and the second crawl extension 156 may extend away from the frame 102 at about a 90° angle.

FIG. 3 depicts the jump span 152 and the crawl span 158 being substantially equal, however, in other embodiments, the jump span 152 and crawl span 158 may be unequal. For example, the jump span 152 may be greater than the crawl span 158 or the jump span 152 may be less than the crawl span 158.

Figure 4:
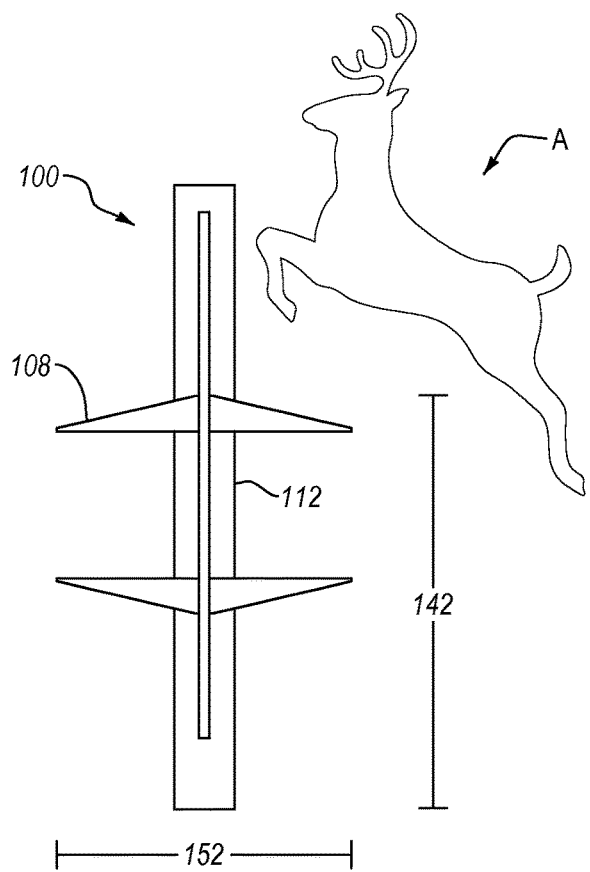
FIG. 4 is a side view of the wildlife access fence of FIG. 1 illustrating an animal passing through a jump-through section, according to the present disclosure.

FIG. 4 depicts an animal A passing through the jump-through section 104 of the pass-through device 100. The animal A must leap over the full jump span 152 of the jump guard 108 at the jump height 142 of the pass-through device 100 mounted to the post 112. The horizontal jump span 152 requires the animal A to be capable of leaping over the jump height 142 in stride and/or with horizontal movement, rendering the pass-through device 100 more selectively limiting than a simple vertical fence or wall. For example, as described herein, a pronghorn antelope may readily leap larger distances horizontally due to their speed than vertically, as pronghorn typically are not faced with vertical obstacles in their natural environment. The particular ratio of jump height 142 to jump span 152 may, therefore, selectively limit the wildlife that may pass-through the pass-through device 100. In some embodiments, a jump ratio of jump height 142 to jump span 152 may be in a range having upper and lower limits including any of 1.00, 1.25, 1.50, 1.75, 2.00, 2.25, 2.50, or any value therebetween. For example, the jump ratio may be in a range of 1.00 to 2.50. In another example, the jump ratio may be in a range of 1.50 to 2.00. In yet another example, the jump ratio may be about 1.75. In at least one embodiment, the jump height may be about 3.50 feet and the jump span 152 may be about 2.00 feet.

Figure 5:
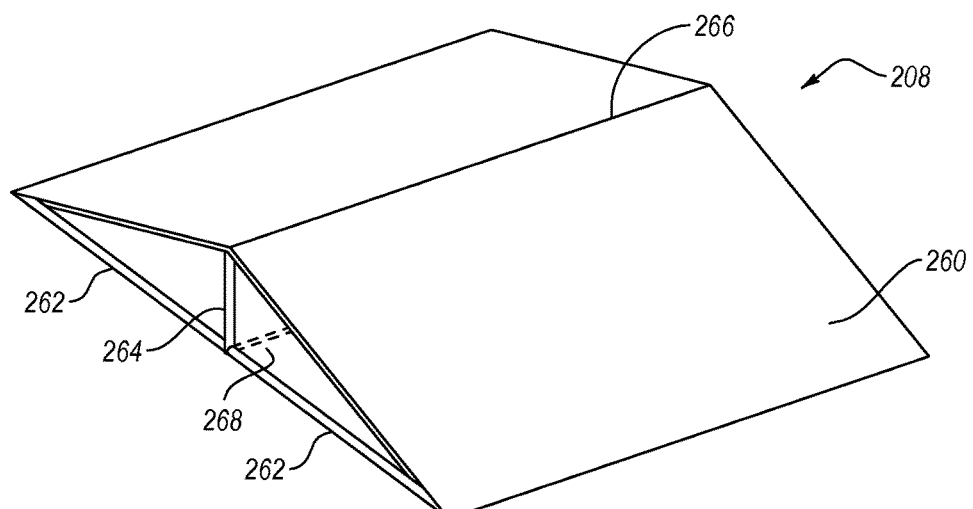
FIG. 5 is a perspective view of one embodiment of a guard that may be used in conjunction with a pass-through section of a wildlife access fence, according to the present disclosure.

FIGS. 5-8 illustrate various embodiments of a jump guards. It should be understood that at least parts of the embodiments of jump guards described herein may be suitable as crawl guards. For example, one or more embodiments of jump guards may be inverted for use as a crawl guard. FIG. 5 depicts an embodiment of a jump guard 208 having a guard surface 260 that may be substantially continuous and solid. The guard surface 260 may be substantially rigid. The guard surface 260 may be supported by a plurality of lateral support members 262. The lateral support members 262 may be made of any material sufficient to support the guard surface 260, such as any of the materials suitable for the frame 102, as described herein. An optional vertical support member 264 may extend between the guard surface 260 and the lateral support members 262. The vertical support member 264 may support a peak 266 in the guard surface 260. In other embodiments, at least part of the guard surface 260 may be curved, and the peak 266 may be an apex of the curved portion of the guard surface 260. In yet other embodiments, the guard surface 260 may be substantially flat and/or planar and the vertical support member 264 may support a centerline of the guard surface 260. The jump guard 208 may include an optional central support member 268 that extends longitudinally along the width of the jump guard 208. In some embodiments, the central support member 268 may be integral with one or more of the horizontal struts of the frame, such as the horizontal struts 114 described in relation to frame 102 in FIG. 2. In other embodiments, the central support member 268 may be a unique and individual component of the fence. Alternatively, in another embodiment central support member 268 may be configured to cooperate with the horizontal struts 114 of the frame. Similarly, the vertical support member 264 may be integral with one or more of the vertical struts of the frame, such as the vertical struts 116 described in relation to frame 102 in FIG. 2. In other embodiments, the vertical support member 264 may be a unique and individual component of the fence. In another embodiment vertical support member 264 may be configured to cooperate with the vertical struts 116 of the frame.

Figure 6:
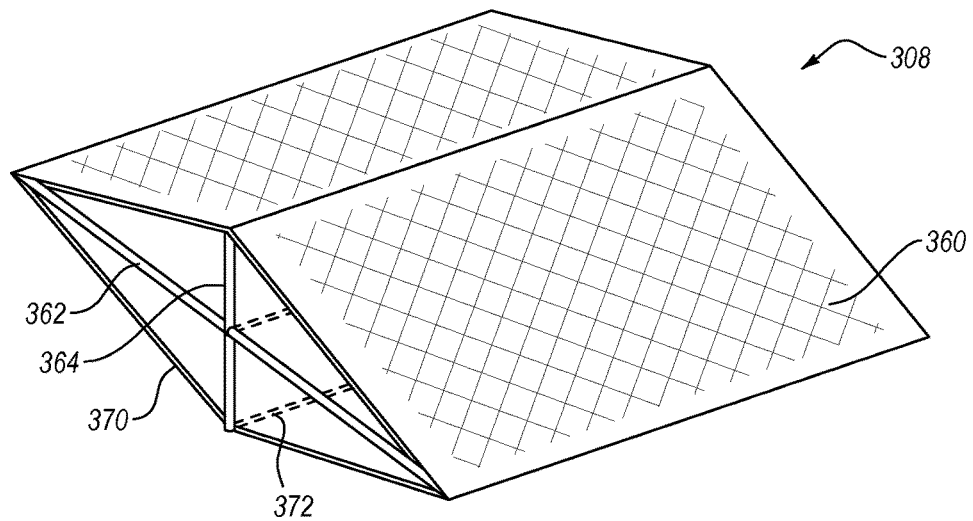
FIG. 6 is a perspective view of one embodiment of a guard having a guard surface with one or more openings therethrough to allow drainage and may be used in conjunction with a pass-through section of a wildlife access fence, according to the present disclosure.

FIG. 6 depicts another embodiment of a jump guard 308 according to the present disclosure. The jump guard 308 may have one or more components in common with the jump guard 208 described in relation to FIG. 5. The jump guard 308 of FIG. 6 may include additional and/or distinct support members. In some embodiments, the jump guard 308 may include lower lateral support members 370 in addition to or alternatively to the lateral support members 362. The vertical support member 364 of the jump guard 308 having lower lateral support members 370 may extend beyond the lateral support members 362 to connect to the lower lateral support member 370. For example, as described herein, the lateral support members 362 may extend substantially horizontally, and the lower lateral support members 370 may extend at an angle between the vertical support member 364 and the edge of the guard surface 360. The jump guard 308 may include a lower central support member 372 that that extends longitudinally along the width of the jump guard 308. In some embodiments, the lower central support member 372 may be integral with one or more of the horizontal struts of the frame, such as the horizontal struts 114 described in relation to frame 102 in FIG. 2. In other embodiments, the lower central support member 372 may be a unique and individual component of the fence. Alternatively, in another embodiment central support member 372 may be configured to cooperate with the horizontal struts 114 of the frame.

In some embodiments, the guard surface 360 may have one or more openings therethrough. As shown in FIG. 6, the guard surface 360 may be a mesh or lattice material. For example, the guard surface 360 may be a sheet of woven metal. The sheet of woven metal may be substantially continuous over the entire guard surface 360. In other embodiments, the guard surface 360 may include a solid sheet of material with one or more perforations and/or openings formed in the guard surface 360. For example, the guard surface 360 may be one or more sheets of metal, such as steel, with a plurality of holes drilled therein. A guard surface 360 having one or more openings therethrough may limit or prevent other materials from building up on the guard surface, applying additional force to the guard and/or altering a jump height of the fence, and potentially damaging the fence and/or impairing the functionality of the fence. For example, a guard surface 360 having one or more opening therethrough may allow snow, ice, rain, other fluids, windborne debris, other materials, or combinations thereof from building up on the guard surface. A guard surface 360 having one or more opening therethrough may allow wind, which may become very strong on open ranchland, to pass through the guard surface instead of applying a potentially damaging amount of force to the guard surface 360.

Figure 7:
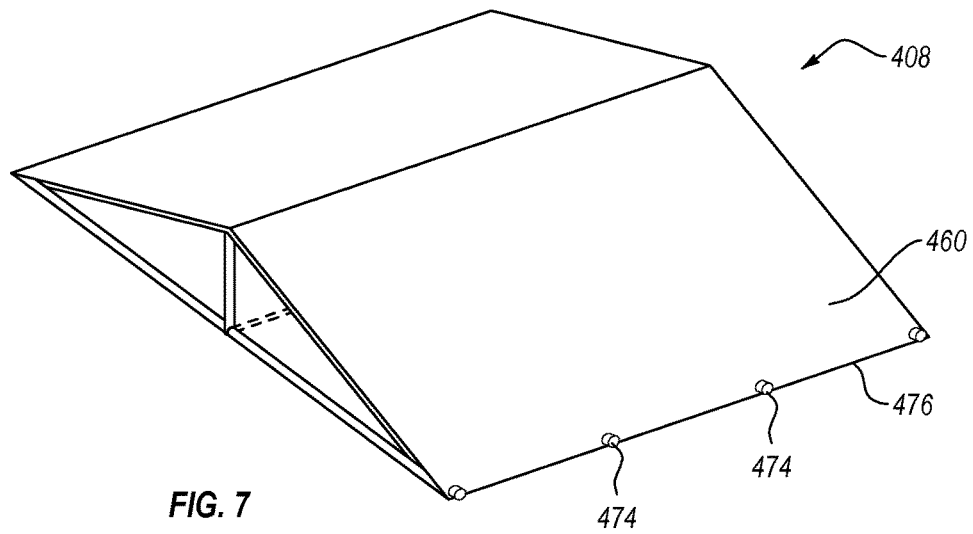
FIG. 7 is a perspective view of one embodiment of a guard having one or more rub points protruding therefrom and that may be used in conjunction with a pass-through section of a wildlife access fence, according to the present disclosure.

FIG. 7 depicts an embodiment of a jump guard 408 having a plurality of rub points 474 affixed to the jump guard 408. The rub points 474 may be affixed to the guard surface 460 or to an outer edge 476 of the jump guard 408. In some embodiments, the outer edge 476 may be a terminal edge of the guard surface 460. In other embodiments, the outer edge 476 may be bent angle of the guard surface 460. In yet other embodiments, the outer edge 476 may be a support member that forms a frame of the jump guard 408 with other support members (such as the lateral support members 362, central support members 372, vertical support member 364, lower support members 370, or combinations thereof described in relation to FIG. 6). In yet further embodiments, the outer edge 476 may include a rounded surface to decrease pressure on the cattle, thereby reducing the likelihood of harm to the cattle.

The rub points 474 may protrude at any angle in relation to the guard surface 460 and/or outer edge 476. In some embodiments, the rub points 474 may protrude substantially perpendicularly to the guard surface 460. In other embodiments, the rub points 474 may extend outwardly from the guard surface 460 and/or outer edge 476 in a direction away from the frame to which the jump guard 408 may be attached. In at least one embodiment, the rub points 474 may protrude outwardly from the outer edge 476 in a direction substantially perpendicular to the frame to which the jump guard 408 may be attached. At least one rub point 474 may protrude a distance in range having upper and lower values including any of 0.25 inches, 0.50 inches, 0.75 inches, 1.00 inches, 1.25 inches, 1.50 inches, 1.75 inches, 2.00 inches, or any value therebetween. For example, at least one of the rub points 474 may protrude a distance in a range of 0.25 inches to 2.00 inches. In another example, at least one of the rub points 474 may protrude a distance in a range of 0.50 inches to 1.50 inches. In yet another example, at least one of the rub points 474 may protrude about 1.00 inch.

The rub points 474 may deter cattle or other livestock from leaning on, pushing against, or otherwise rubbing against the jump guard 408 without significantly injuring the cattle or other livestock. For example, the rub points 474 may be hard protrusions without a sharp point or corner that may cut an animal. In some embodiments, the rub points 474 may be bolts, nuts, dowels, rods, or other shapes. The rub points 474 may be made of steel alloys, iron alloys, aluminum alloys, titanium alloys, polymers, carbon fiber, wood, or combinations thereof. The rub points 474 may be welded, brazed, adhered, mechanically connected (e.g. clamped, screwed, etc.), or otherwise connected to the jump guard 408.

Figure 8:
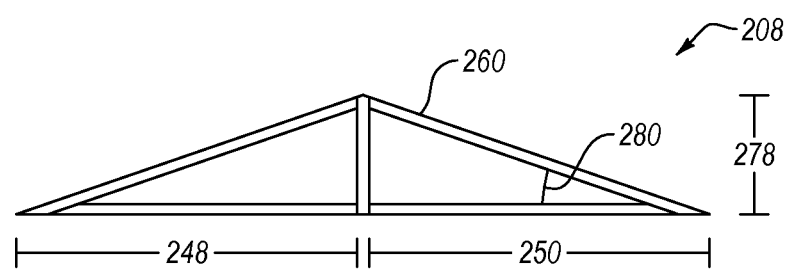
FIG. 8 is a side view of the guard of FIG. 5, according to the present disclosure.

FIG. 8 is a side view of the jump guard 208 of FIG. 5. In some embodiments, the guard surface of a guard may be substantially horizontal. As shown in FIG. 8, in other embodiments, the guard surface 260 of the jump guard 208 may be sloped to aid in both shedding rain, snow, debris, and other material that may collect upon the guard surface 260. The guard surface 260 may have guard height 278 in a range between 0.125 feet, 0.250 feet, 0.375 feet, 0.500 feet, 0.625 feet, 0.750 feet, 0.875 feet, 1.00 foot, or any value therebetween. For example, the guard height 278 may be in a range of 0.125 feet to 1.00 foot. In another example, the guard height 278 may be in a range of 0.250 feet to 0.75 feet. In yet another example, the guard height 278 may be about 0.500 feet. The guard surface 260 may be at a guard angle 280 to horizontal. The guard angle 280 may be the same for the first jump extension 248 and second jump extension 250, or the guard angle 280 may be different. In some embodiments, the guard angle 280 may be in a range having upper and lower values including any of 5°, 10°, 15°, 20°, 25°, 30°, 35°, 40°, 45°, or any value therebetween. For example, the guard angle 280 may be in a range of 5° to 45°. In another example, the guard angle 280 may be in a range of 15° to 40°. In yet another example, the guard angle 280 may be about 30°.

Figure 9:
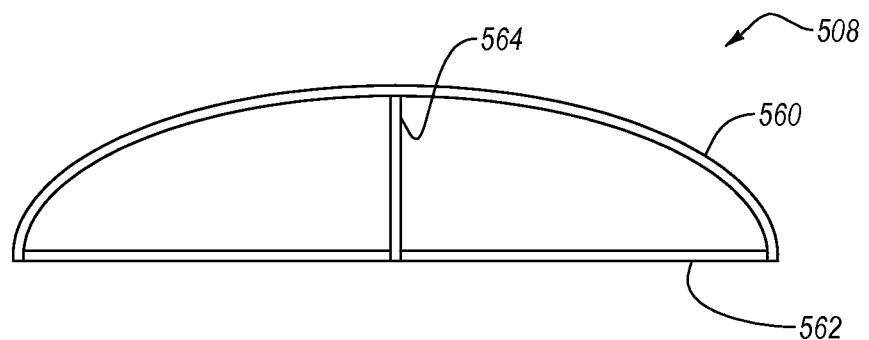
FIG. 9 is a perspective view of one embodiment of a guard having a curved surface, according to the present disclosure.

FIG. 9 is a side view of yet another embodiment of a guard according to the present disclosure. A jump guard 508 may have a curved guard surface 560. In some embodiments, the curved guard surface 560 extends over substantially the entire jump guard 508, while in other embodiments, the curved guard surface 560 may extend over a portion of the jump guard 508. For example, a jump guard may have a guard surface that includes both curved and substantially planar portions. In some embodiments, the curved guard surface 560 may be semi-elliptical in profile. In other embodiments, the curved guard surface 560 may be substantially semi-circular in profile. It will be appreciated by one skilled in the art that the jump guard may have various other configurations such as rectangular, square, round, octagonal, polygonal, circular, or portions and/or combinations thereof.

A fence having one or more pass-through sections with a guard adjacent the pass-through section may allow ranchers to selectively allow wildlife to traverse the fence and reliable limit the movement of livestock therethrough. A jump-through section with a jump guard adjacent may allow deer, elk, antelope, and other leaping wildlife to jump through a section of the fence and continue along a historic game trail. A crawl-through section with a crawl guard adjacent may allow wolves, coyotes, fawns, and other smaller animals to crawl through the fence and follow game trails and/or prey without allowing calves or other smaller livestock to pass through the fence. Because cattle are known to lean or push against fences, the rub points on the guards may discourage cattle from leaning or pushing against the exposed extensions of the guards. A fence and/or gate according to the present disclosure may reduce harm to wildlife and damage to fences, reducing repair time and costs for ranchers, and allowing wildlife to coexist with ranchers.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:
1. A pass-through device for controlling movement of animals through a fence line, the device comprising:
  a frame having a front side, a back side, a top portion, and a bottom portion;
  a pass-through section formed in the frame having a jump-through opening extending therethrough from the front side to the back side, the jump-through opening being unbounded by the top portion of the frame so as to allow an animal to jump through the jump-through opening in the pass-through section of the frame; and a guard affixed to the frame so as to form a bottom of the jump-through opening and to define a jump height, the guard extending generally horizontally away from the front side and the back side of the frame.

2. The device of claim 1, wherein the guard comprises a guard surface having one or more openings therethrough.

3. The device of claim 2, wherein at least a portion of the guard surface has a guard angle in a range of 5° to 45°.

4. The device of claim 1, wherein the guard has a guard span that is ½ the jump height.

5. The device of claim 1, wherein the guard has a guard span that is symmetrical relative to the front side of the frame and the back side of the frame.

6. The device of claim 1, wherein the guard further comprises lower lateral support members to support the guard against deflections relative to the frame.

7. The device of claim 1, wherein the guard further comprises rub points protruding from the guard.

8. A pass-through device for controlling movement of animals through a fence line, the device comprising:
    a frame having a frame height and a frame width defining an outer profile, the outer profile having a top edge and a bottom edge, the frame having a front side and a back side;
    a first opening formed in the frame within the outer profile, the first opening extending between the front side and the back side of the frame and being bounded on at least two sides by the frame, the first opening being adjacent to the top edge of the outer profile and being unbounded by the frame along the top edge of the outer profile;
    a first guard affixed to the frame and bounding at least one side of the first opening, the first guard extending outward away from the front side and the back side of the frame; and
    a second opening in the frame within the outer profile, the second opening extending between the front side and the back side and being bounded on at least three sides by the frame, the second opening being adjacent to the bottom edge of the outer profile.

9. The device of claim 8, wherein the second opening is bounded on four sides.

10. The device of claim 9, wherein the second opening defines a crawl-through height in a range of 1.00 foot to 2.50 feet.

11. The device of claim 9, wherein the first guard defines a jump span in a range of 1.0 foot to 3.00 feet.

12. The device of claim 9, wherein the second guard defines a crawl span in a range of 1.0 foot to 3.00 feet.

13. The device of claim 8, wherein the first guard is permanently affixed to the frame.

14. A pass-through device for controlling movement of animals through a fence line, the device comprising:
    a frame having a frame height and a frame width defining an outer profile, the outer profile having a top edge and a bottom edge, the frame having a front side and a back side;
    a first opening formed in the frame within the outer profile, the first opening extending between the front side and the back side of the frame and being bounded on at least two sides thereby, the first opening being adjacent to the top edge of the outer profile and being unbounded by the frame along the top edge of the outer profile;
    a first guard affixed to the frame and bounding at least one side of the first opening, at least a portion of the first guard extending substantially horizontally away from the front side and the back side of the frame; and
    a second opening formed in the frame within the outer profile, the second opening extending between the front side and the back side and being bounded on at least three sides by the frame, the second opening adjacent the bottom edge of the outer profile; and
    a second guard affixed to the frame and adjacent the second opening, the second guard extending away from the front side and the back side of the frame.

15. The device of claim 14, wherein the first guard is affixed to a bottom of the first opening and the first guard has a first guard surface that slopes downward, and the second guard is affixed to a top of the second opening, the second guard having a second guard surface that slopes upward.

16. An enclosure system for controlling movement of animals which allows wildlife to pass through the device, the system comprising:
    fencing including a plurality of posts;
    a pass-through device comprising,
        a frame having a front side, a back side, a top portion, and a bottom portion
        a jump-through section formed in the frame defining a jump-through opening extending therethrough from the front side to the back side, the jump-through opening configured to have a jump height, the jump-through opening being unbound by the top portion of the frame; and,
        a jump guard affixed to the jump-through section, at least a portion of the jump guard extending outwardly away from the front side and the back side of the frame in a direction generally perpendicular to the frame; and
    wherein the pass-through device is attached to at least one of the plurality of posts.

17. The system of claim 16, the pass-through device further comprising:
    a crawl-through section located within a lower section of the frame and adjacent a bottom edge of the frame, and
    a crawl guard affixed to the crawl-through section, the crawl guard including a crawl guard surface extending outwardly away from the front side and the back side of the frame.

18. The system of claim 17, wherein the jump guard and crawl guard each further comprise at least one rub point protruding therefrom.

19. The system of claim 16, wherein the jump guard defines a guard height in a range of 1.50 feet to 6.00 feet.

20. The system of claim 16, wherein the jump height is in a range of 2.50 feet to 6.00 feet.

* * * * *